(12) United States Patent
Morita

(10) Patent No.: US 8,751,128 B2
(45) Date of Patent: Jun. 10, 2014

(54) DRIVING ASSISTANCE DEVICE

(75) Inventor: Makoto Morita, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/318,631

(22) PCT Filed: Jun. 17, 2009

(86) PCT No.: PCT/JP2009/061021
§ 371 (c)(1),
(2), (4) Date: Nov. 3, 2011

(87) PCT Pub. No.: WO2010/146669
PCT Pub. Date: Dec. 23, 2010

(65) Prior Publication Data
US 2012/0101703 A1    Apr. 26, 2012

(51) Int. Cl.
*G06F 7/70* (2006.01)
*B60T 7/12* (2006.01)
*B60T 8/32* (2006.01)
*B60T 8/86* (2006.01)

(52) U.S. Cl.
USPC ............. 701/70; 701/79; 701/93; 701/96; 303/125

(58) Field of Classification Search
CPC ............................... B62D 21/14; B60T 7/22
USPC ........................................... 701/79, 70
See application file for complete search history.

(56) References Cited

U.S. PATENT DOCUMENTS

| 7,257,478 B2 | 8/2007 | Sugano | |
| 2004/0090117 A1* | 5/2004 | Dudeck et al. | 303/191 |
| 2005/0143878 A1* | 6/2005 | Park et al. | 701/22 |
| 2007/0299612 A1* | 12/2007 | Kimura et al. | 701/301 |
| 2008/0243389 A1* | 10/2008 | Inoue et al. | 701/301 |
| 2009/0088966 A1 | 4/2009 | Yokoyama et al. | |

FOREIGN PATENT DOCUMENTS

| JP | 2000-159077 A | 6/2000 |
| JP | 2001-070357 A | 3/2001 |
| JP | 2002-153515 A | 5/2002 |
| JP | 2005-112300 A | 4/2005 |
| JP | 2005-205980 A | 8/2005 |
| JP | 2008-242544 A | 10/2008 |
| JP | 2009-078733 A | 4/2009 |
| JP | 2009-090829 A | 4/2009 |

OTHER PUBLICATIONS

PCT/JP2009/061021—International Preliminary Report on Patentability dated Jan. 17, 2012.

* cited by examiner

*Primary Examiner* — Fadey Jabr
*Assistant Examiner* — Basil T Jos
(74) *Attorney, Agent, or Firm* — Gifford, Krass, Sprinkle, Anderson & Citkowski, P.C.

(57) ABSTRACT

Disclosed is a driving assistance device capable of appropriately performing deceleration control in a moving vehicle having a variable wheelbase length. A driving assistance device 1 includes a wheelbase length detection sensor 11 which detects the wheelbase length of a moving vehicle X having a variable wheelbase length, a laser radar 10 which detects an obstacle in front of the moving vehicle X, and an ECU 15. In the driving assistance device 1, when an obstacle is detected by the laser radar 10, deceleration control of the moving vehicle X is performed depending on the wheelbase length detected by the wheelbase length detection sensor 11. Therefore, it is possible to suppress the disturbance of the behavior of the moving vehicle X due to the wheelbase length when deceleration control is performed.

4 Claims, 4 Drawing Sheets

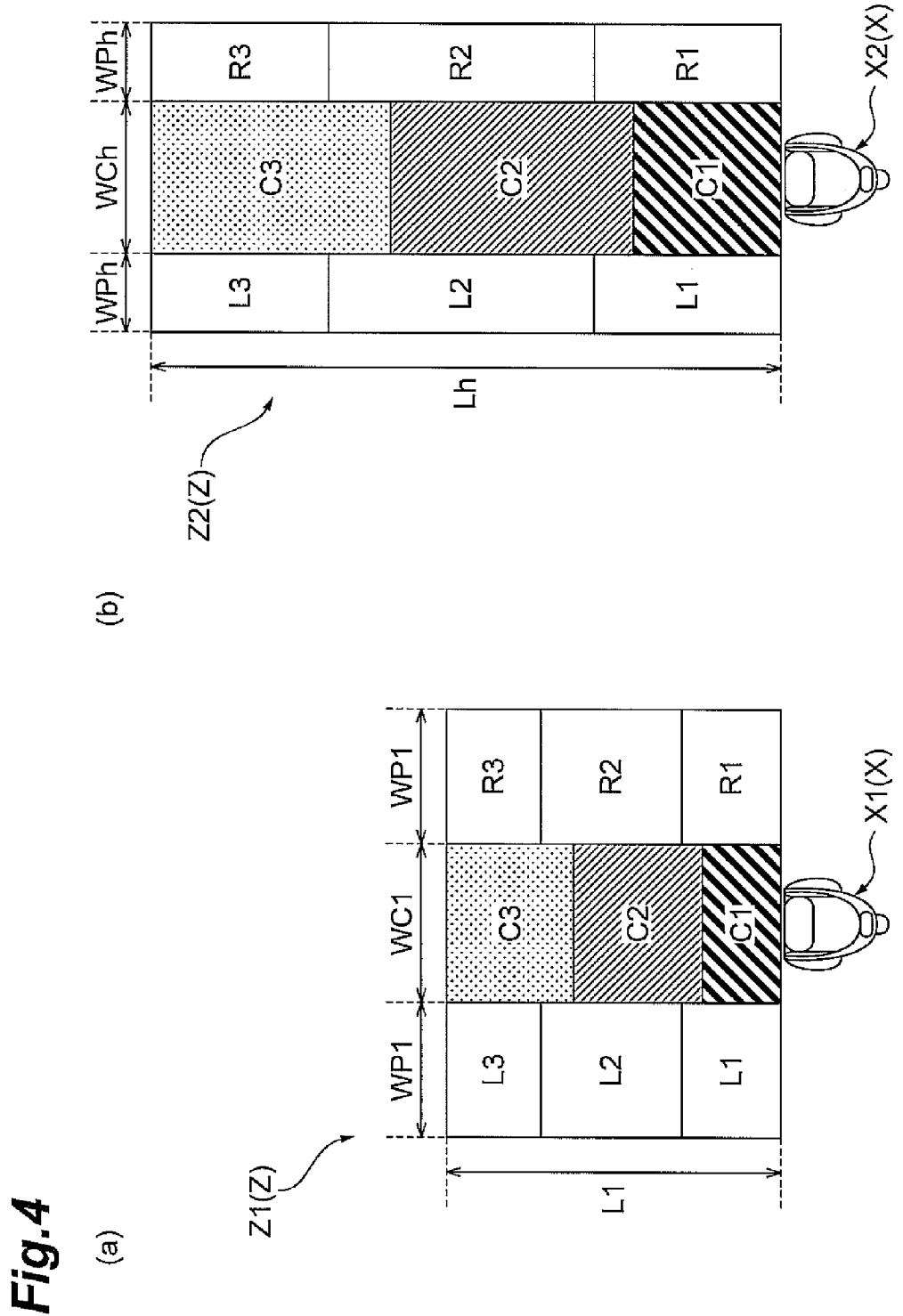

DRIVING ASSISTANCE DEVICE

TECHNICAL FIELD

The present invention relates to a driving assistance device which assists driving of a moving vehicle having a variable wheelbase length.

BACKGROUND ART

A driving assistance device of the related art is known which acquires obstacle information relating to an obstacle around a moving vehicle and performs deceleration control of the moving vehicle on the basis of the acquired obstacle information. For example, Patent Literature 1 describes a driving assistance device which monitors forward of a vehicle (moving vehicle), and when an obstacle is detected, performs deceleration control in accordance with an area where the obstacle is present.

CITATION LIST

Patent Literature
[Patent Literature 1] Japanese Unexamined Patent Application Publication No. 2008-242544

SUMMARY OF INVENTION

Technical Problem

In a moving vehicle having a variable wheelbase length, even when the same deceleration control is performed depending on the wheelbase length, unnecessary deceleration control is done or deceleration is insufficient, leading to the disturbance of the behavior of the moving vehicle. For this reason, in the above-described driving assistance device, deceleration control may not be appropriately performed.

An object of the invention is to provide a driving assistance device capable of appropriately performing deceleration control in a moving vehicle having a variable wheelbase length.

Solution to Problem

In order to solve the above-described object, an aspect of the invention provides a driving assistance device which is mounted in a moving vehicle having a variable wheelbase length and assists driving of the moving vehicle. The driving assistance device includes a wheelbase length information acquisition unit which acquires wheelbase length information relating to the wheelbase length of the moving vehicle, an obstacle information acquisition unit which acquires obstacle information relating to an obstacle around the moving vehicle, and a deceleration control unit which performs deceleration control of the moving vehicle on the basis of the obstacle information acquired by the obstacle information acquisition unit. The deceleration control unit performs the deceleration control depending on the wheelbase length information acquired by the wheelbase length information acquisition unit.

In this driving assistance device, the deceleration control is changed depending on the wheelbase length information, thereby taking into consideration the wheelbase length for the deceleration control and suppressing the disturbance of the behavior of the moving vehicle due to the wheelbase length when the deceleration control is performed. Therefore, it becomes possible to appropriately perform deceleration control in a moving vehicle having a variable wheelbase length.

A specific configuration for preferably obtaining the above-described functional effects is as follows. The deceleration control unit may perform the deceleration control on the basis of a deceleration control map which includes a plurality of areas set around the moving vehicle and deceleration patterns set for the plurality of areas. When an obstacle presence area where the obstacle is present from among the plurality of areas is detected on the basis of the obstacle information, the deceleration control may be performed with the deceleration pattern in the detected obstacle presence area, and the plurality of areas in the deceleration control map may be changed depending on the wheelbase length information.

It is preferable that the obstacle information acquisition unit acquires obstacle information relating to an obstacle in front of the moving vehicle, and the deceleration control unit changes at least one of a plurality of areas set in front of the moving vehicle in the deceleration control map so as to be expanded forward as the wheelbase length increases or so as to be expanded in a width direction as the wheelbase length decreases. Usually, with regard to the behavior characteristics of the moving vehicle, when the wheelbase length is long, the speed is high and the turning radius is large, and when the wheelbase length is short, the speed is low and the turning radius is small. For this reason, if at least one of a plurality of areas is changed so as to be expanded forward as the wheelbase length increases or so as to be expanded in the width direction as the wheelbase length decreases, it becomes possible to perform preferable deceleration control adapted to the behavior characteristics according to the wheelbase length, and to further appropriately perform deceleration control.

The deceleration control unit may perform the deceleration control such that the speed of the moving vehicle is equal to or lower than a predetermined speed. In this case, preferable deceleration control is performed when preventing the moving vehicle from being in contact with an obstacle.

Advantageous Effects of Invention

According to the invention, it is possible to appropriately perform deceleration control in a moving vehicle having a variable wheelbase length.

BRIEF DESCRIPTION OF DRAWINGS

FIG. 4($a$) is a diagram showing an obstacle detection zone at the time of a short wheelbase, and FIG. 4($b$) is a diagram showing an obstacle detection zone at the time of a long wheelbase.

DESCRIPTION OF EMBODIMENTS

Figure 1:
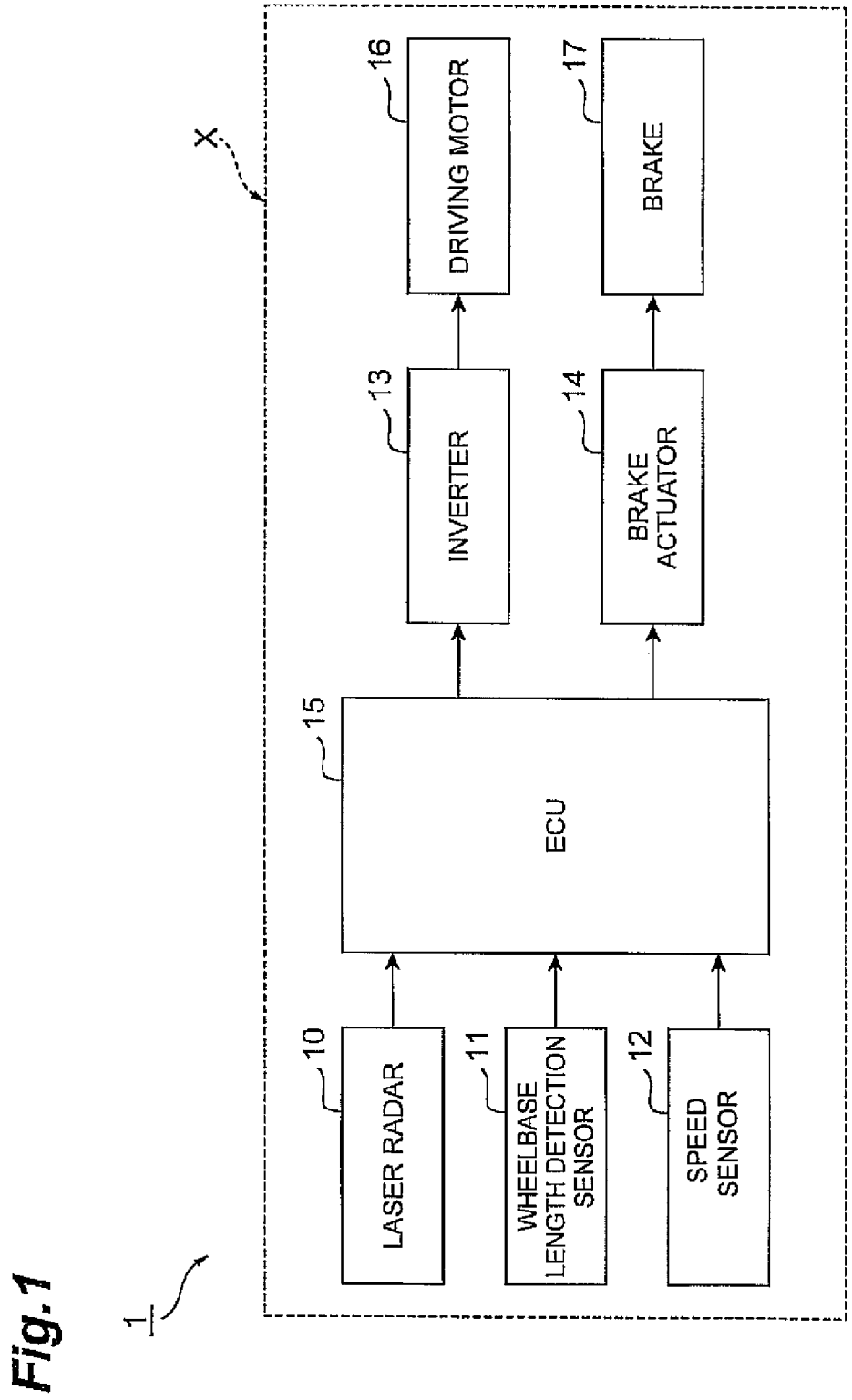
FIG. 1 is a block diagram showing a driving assistance device according to an embodiment of the invention.

Hereinafter, a preferred embodiment of the invention will be described in detail with reference to the drawings. In the following description, the same or equivalent elements are represented by the same reference numerals, and overlapping description will be omitted. The terms "front", "rear", "left", "right", "upper", and "lower" correspond to the front-rear direction, the left-right direction, and the up-down direction of the moving vehicle.

FIG. 1 is a block diagram showing a driving assistance device according to an embodiment of the invention. As shown in FIG. 1, a driving assistance device 1 of this embodiment is mounted in a moving vehicle X having a variable wheelbase length. First, the moving vehicle X will be described.

Figure 2:
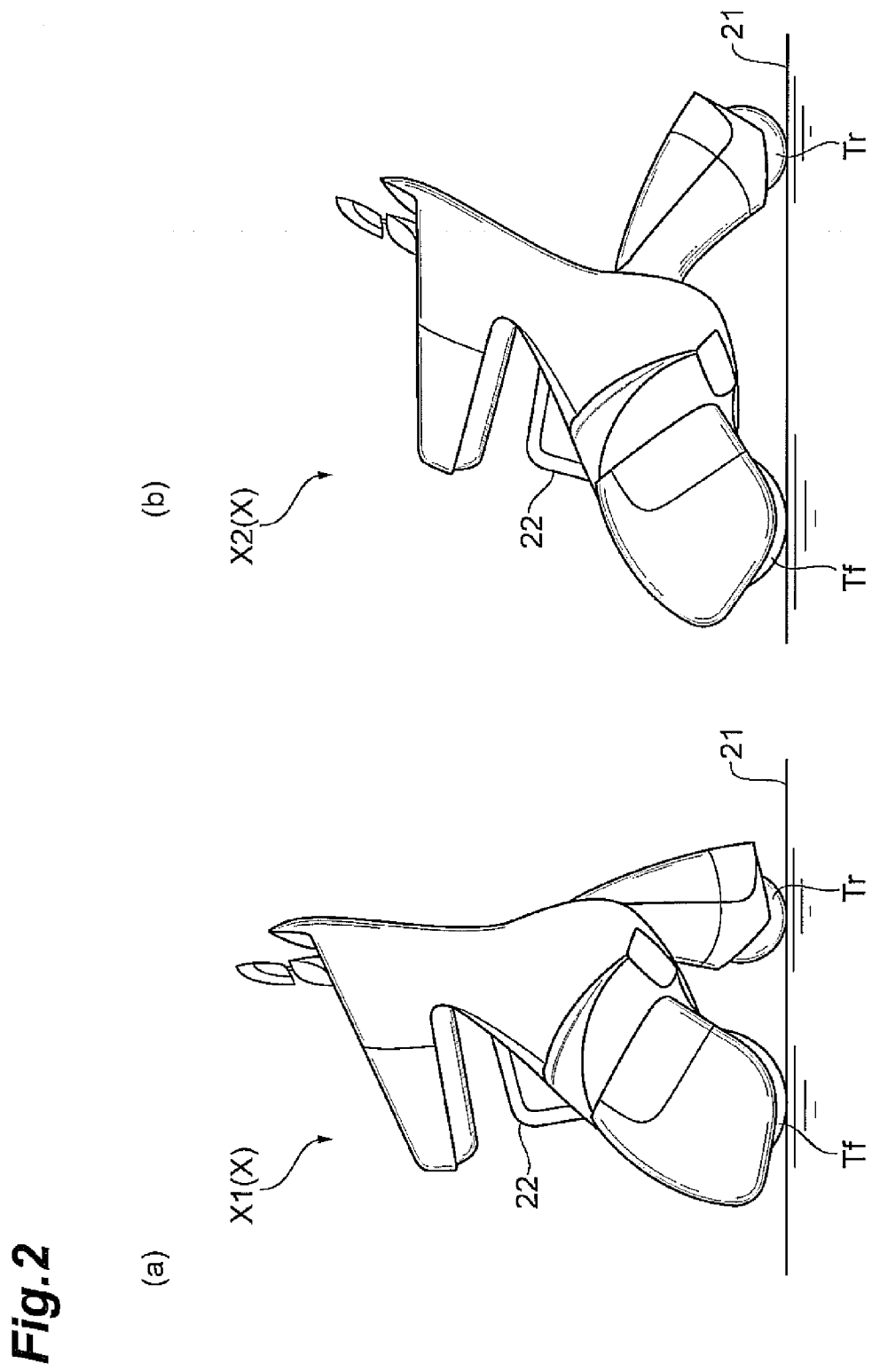
FIG. 2 is a side view showing a moving vehicle.

FIG. 2(a) is a side view showing a moving vehicle at the time of a short wheelbase (walking mode), and FIG. 2(b) is a side view showing a moving vehicle at the time of a long wheelbase (driving mode). As shown in FIG. 2, the moving vehicle X is a one-seated electric vehicle, and a three-wheel vehicle which includes two front wheels Tf on the front side and one rear wheel Tr. In the moving vehicle X, the driving of a driving motor 16 (see FIG. 1) generates a driving force, and the regeneration of the driving motor 16 and a brake 17 (see FIG. 1) generate a braking force. The moving vehicle X can be driven on a driving surface 21, such as a road surface, a floor, or a ground, at various places, such as a road, a sidewalk, and a work area in a facility. The moving vehicle X is operated by operating levers or switches provided on the left and right sides of a seat 22 on which a driver sits.

The moving vehicle X includes a mechanism which is deformed by varying the inclination state with respect to the driving surface 21 while varying a wheelbase length (that is, the distance between the axial center of the front wheels Tf and the axial center of the rear wheel Tr). The moving vehicle X can be deformed to be driven in two driving modes of a walking mode (low-speed mode) shown in FIG. 2(a) and a driving mode (high-speed mode) shown in FIG. 2(b).

A moving vehicle X1 in the walking mode can be driven at a walking speed of a pedestrian, for example, maximum 6 km/h. In the moving vehicle X1 in the walking mode, the center position is higher and the wheelbase length is shorter than a moving vehicle X2 in the driving mode. Thus, the moving vehicle X1 can turn at a small turning radius.

The moving vehicle X2 in the driving mode can be driven at a comparatively high speed, for example, maximum 30 km/h. In the moving vehicle X2 in the driving mode, the center position is lower and the wheelbase length is longer than the moving vehicle X1 in the walking mode. Therefore, in the moving vehicle X2, stability is achieved at the time of high-speed driving.

In the moving vehicle X, for example, if a switch is operated by the driver, deformation is made such that the vehicle posture changes between the walking mode and the driving mode. Specifically, for example, when deforming the moving vehicle X from the walking mode to the driving mode, a variable motor (actuator) is driven to relatively move the rear wheel Tr rearward with respect to the front wheels Tf. Then, the wheelbase length is stretched (extended) and the height decreases to lower the center position, and the inclination state of the moving vehicle X becomes a rearward inclination with respect to the driving surface 21 (deformation is made such that the front side of the moving vehicle X turns upward and the rear side of the moving vehicle X turns downward).

For example, when deforming the moving vehicle X from the driving mode to the walking mode, the variable motor is driven to relatively move the rear wheel Tr forward with respect to the front wheels Tf. Then, the wheelbase length is reduced (shortened) and the height increases to raise the center position, and the inclination state of the moving vehicle X becomes forward inclination with respect to the driving surface 21 (deformation is made such that the front side of the moving vehicle X turns downward and the rear side of the moving vehicle X turns upward).

Returning to FIG. 1, the driving assistance device 1 usually performs control at a vehicle speed according to the accelerator operation and the brake operation of the driver. In particular, for safe driving in relation with an obstacle (for example, a moving object, such as a pedestrian or a bicycle, a still object, such as a telegraph pole, a mailbox, or a dropping), the driving assistance device 1 sets the maximum speed (predetermined speed) in accordance with the relative positional relationship between the moving vehicle X and the obstacle, and performs deceleration control such that the vehicle speed of the moving vehicle X is equal to or lower than the maximum speed.

The driving assistance device 1 includes a laser radar 10, a wheelbase length detection sensor 11, a speed sensor 12, an inverter 13, a brake actuator 14, and an ECU (Electronic Control Unit) 15.

The laser radar 10 monitors and detects an object in front of the moving vehicle X using laser light. The laser radar 10 is attached to the front side (traveling direction) of the moving vehicle X. The laser radar 10 emits laser light forward while scanning horizontally, receives reflected laser light, and outputs data of laser light to the ECU 15 as a radar signal. Data of the radar signal includes obstacle information, such as the relative position (distance and direction) of an obstacle with respect to the moving vehicle X.

The wheelbase length detection sensor 11 is a sensor which detects the wheelbase length of the moving vehicle X. The wheelbase length detection sensor 11 detects the rotation speed of the variable motor which is actuated to vary the wheelbase length, and derives and detects the wheelbase length on the basis of the rotation speed. The wheelbase length detection sensor 11 outputs the detected wheelbase length to the ECU 15 as a wheelbase length signal.

The speed sensor 12 is a sensor which detects the vehicle speed of the moving vehicle X. The speed sensor 12 outputs the detected vehicle speed to the ECU 15 as a speed signal.

The inverter 13 is an inverter which controls the rotational driving/regenerative power generation of the driving motor 16. The inverter 13 supplies power charged in a battery (not shown) to the driving motor 16 in response to a motor driving signal input from the ECU 15. The inverter 13 charges the battery with power by the regenerative power generation of the driving motor 16 in response to a motor regeneration control signal input from the ECU 15.

The driving motor 16 has a function as an electric motor which is the driving source of the moving vehicle X. Specifically, if power is supplied from the inverter 13, the driving motor 16 is driven to rotation in accordance with the power and generates a driving force. The driving motor 16 has a function as a generator, converts rotational energy (kinetic energy) of the wheels Tf and Tr to electrical energy, and performs regenerative power generation. Specifically, the driving motor 16 performs regenerative power generation under the control of the inverter 13, and charges the battery with power by regenerative power generation through the inverter 13.

The brake actuator 14 is an actuator which actuates the brake 17 of the moving vehicle X. If a mechanical brake control signal is input from the ECU 15, the brake actuator 14 actuates the brake 17 in response to the mechanical brake control signal.

The ECU 15 is an electronic control unit which includes a CPU, a ROM, a RAM, and the like, and performs overall control of the driving assistance device 1. The ECU 15 outputs control signals to the inverter 13 and the brake actuator 14 on the basis of the detection signals input from the sensors 10, 11, and 12. The ECU 15 performs deceleration control of the moving vehicle X in accordance with the vehicle speed and the wheelbase length of the moving vehicle X using a deceleration control map (the details thereof will be described below).

Figure 3:
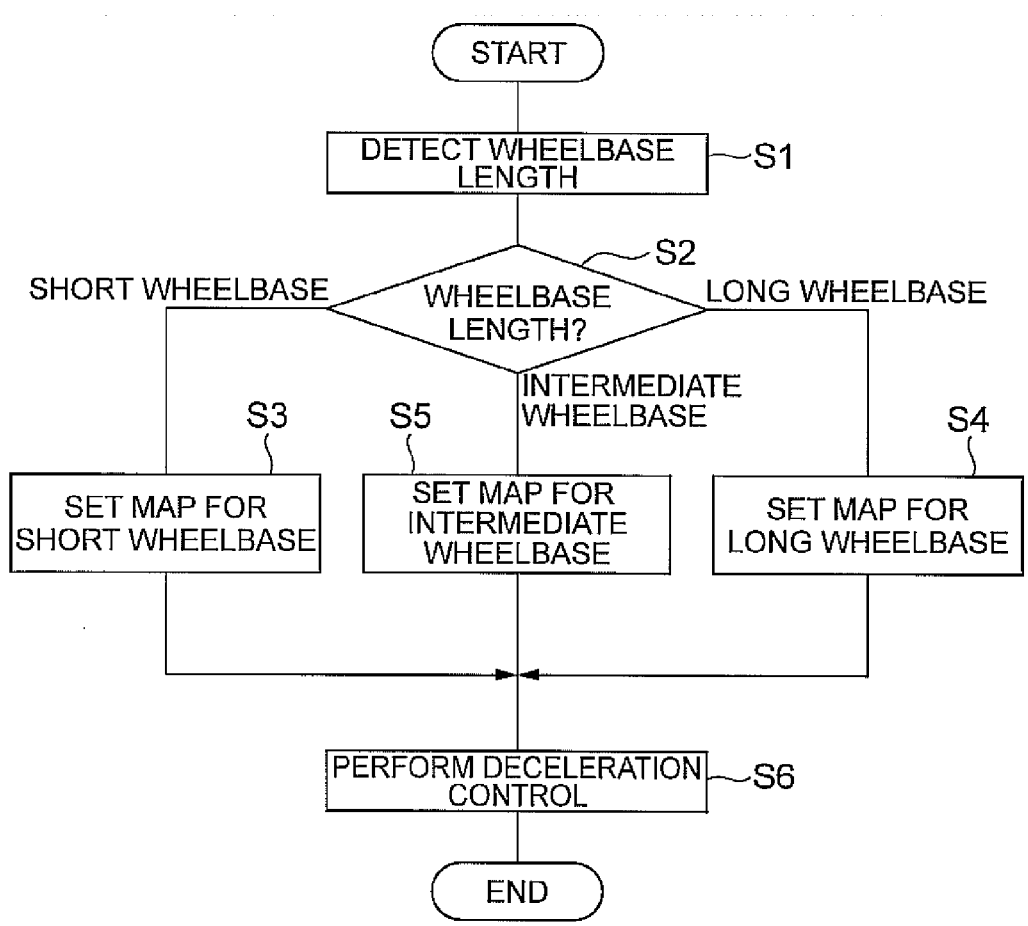
FIG. 3 is a flowchart showing the operation of the driving assistance device of FIG. 1.

Next, the operation of the above-described driving assistance device 1 will be described with reference to a flowchart of FIG. 3.

In the driving assistance device 1 of this embodiment, first, the wheelbase length of the moving vehicle X is detected by the wheelbase length detection sensor 11 (S1). Subsequently, in the ECU 15, when the wheelbase length is a short wheelbase (that is, at the time of the walking mode), a map for a short wheelbase is set in the deceleration control map (S2→S3). When the detected wheelbase length is a long wheelbase (that is, at the time of the driving mode), a map for a long wheelbase is set in the deceleration control map (S2→S4).

The deceleration control map includes an obstacle detection zone Z which is an area on a route, in which the moving vehicle X is driven, in front of the moving vehicle X. Specifically, as shown in FIG. 4, when the moving vehicle X is driven straight forward, as the obstacle detection zone Z, an obstacle detection zone Z is set as a virtual area which is expanded in a rectangular shape in front of the moving vehicle X.

The obstacle detection zone Z is divided into three areas in each of the width direction and the depth direction, and has nine areas C1, C2, C3, L1, L2, L3, R1, R2, and R3. Specifically, the obstacle detection zone Z is provided with collision monitoring areas C1 to C3 in the center, peripheral monitoring areas L1 to L3 on the left side, and peripheral monitoring areas R1 to R3 on the right side.

In the collision monitoring areas C1 to C3, since there is a high possibility that, if an obstacle is present, the moving vehicle X collides against the obstacle moving vehicle X because the areas are on the route of the moving vehicle X, it is necessary to secure sufficient safety. In the peripheral monitoring areas L1 to L3 and R1 to R3, since, if an obstacle is present, the moving vehicle X dodges past the obstacle because the areas are lateral to the route of the moving vehicle X, a lot of attention is required.

The width of each of the collision monitoring areas C1 to C3 is greater than the width of the moving vehicle X, and has a marginal width such that, when an obstacle is present in any area of the peripheral monitoring areas L1 to L3 and R1 to R3, the moving vehicle X safely dodges past the obstacle. The width of each of the peripheral monitoring areas L1 to L3 and R1 to R3 may be equal to the width of each of the collision monitoring areas C1 to C3 or may be a width corresponding to a road width or the like. The areas C1, L1, and R1 nearest the moving vehicle X in the obstacle detection zone Z, the subsequent areas C2, L2, and R3, and the areas C3, L3, and R3 farthest from the moving vehicle X may be equal in length (hereinafter, simply referred to as "length") in the front-back direction, or may differ in length, for example, such that the nearer the moving vehicle X, the shorter the length.

In the obstacle detection zone Z, the collision monitoring areas C1 to C3 and the peripheral monitoring areas L1 to L3 and R1 to R3 may be equal in length, or may differ, for example, such that the nearer the moving vehicle X, the shorter the length of each of the collision monitoring areas C1 to C3. The width or the length in the depth direction is set by an experiment or the like.

The deceleration control map includes the maximum speed (deceleration pattern) for each of the areas C1 to C3, L1 to L3, and R1 to R3 of the obstacle detection zone Z. The nearer the moving vehicle X, the lower the maximum speed in each of the areas C1, L1, and R1 nearest the moving vehicle X in the obstacle detection zone Z, the subsequent areas C2, L2, and R3, and the areas C3, L3, and R3 farthest from the moving vehicle X.

From among the collision monitoring areas C1 to C3 and the peripheral monitoring areas L1 to L3 and R1 to R3, in the collision monitoring areas C1 to C3, the maximum speed is low. The maximum speed of each of the areas C1 to C3, L1 to L3, and R1 to R3 is set by an experiment or the like in accordance with the distance to each of the areas C1 to C3, L1 to L3, and R1 to R3 or the direction. With regard to the maximum speed, at least the following speed is set in accordance with the legal maximum speed applied to the moving vehicle X.

Usually, since the behavior characteristics of the moving vehicle X change depending on the wheelbase length, for the moving vehicle X, a safe area changes depending on the wheelbase length. That is, if the wheelbase length is long, the speed is high and the turning radius increases, such that deceleration is not easily done. For this reason, in order that the start of deceleration is not delayed, more monitoring areas in front of the moving vehicle X are required. If the wheelbase length is short, the speed is low and the turning radius decreases. For this reason, in order to cope with a small amount of turning, more monitoring areas in front of the moving vehicle X are required.

In this embodiment, the width of each of the areas C1 to C3, L1 to L3, and R1 to R3 differs between an obstacle detection zone Z1 of a map for a short wheelbase and an obstacle detection zone Z2 of a map for a long wheelbase. Specifically, the width WCl of each of the collision monitoring areas C1 to C3 in the obstacle detection zone Z1 is greater than the width WCh of each of the collision monitoring areas C1 to C3 in the obstacle detection zone Z2. The width WPl of each of the peripheral monitoring areas L1 to L3 and R1 to R3 in the obstacle detection zone Z1 is greater than the width WPh of each of the peripheral monitoring areas L1 to L3 and R1 to R3 in the obstacle detection zone Z2.

A length Ll in the obstacle detection zone Z1 of the map for a short wheelbase differs from a length Lh in the obstacle detection zone Z2 of the map for a long wheelbase. Here, the length Lh in the obstacle detection zone Z2 is greater than the length Ll in the obstacle detection zone Z1.

When the detected wheelbase length is an intermediate wheelbase between the short wheelbase and the long wheelbase (that is, when the wheelbase length is variable), a map for an intermediate wheelbase which is obtained by supplementing the map for a short wheelbase and the map for a long wheelbase is set as a deceleration control map (S2→S5).

That is, when a short wheelbase length is Hl, and a long wheelbase length is Hh, a wheelbase length H is expressed by Expression (1). In fact, in Expression (1), the wheelbase length H when m=0 means the short wheelbase length Hl, and the wheelbase length H when m=1 means the long wheelbase length Hh.

$$H=Hl+m\times(Hh-Hl) \quad (1)$$

Here, m is a variable (0≤m≤1).

Accordingly, in the map for an intermediate wheelbase, for example, with regard to the width WP of each peripheral monitoring area in the obstacle detection zone Z, the width WPl and the width WPh are linearly supplemented and set, as expressed by Expression (2). Incidentally, the length of each of the obstacle detection zones, the collision monitoring areas, and the maximum speed set in each area can be linearly supplemented and set in the same manner as Expression (2).

$$WP=WPl+m\times(WPh-WPl) \quad (2)$$

Subsequently, in the ECU 15, deceleration control is performed using the set deceleration control map (S6). Specifically, it is determined whether or not an obstacle is present in front of the moving vehicle X on the basis of the radar signal input from the laser radar 10. When an obstacle is present, the relative position of the obstacle with respect to the moving vehicle X is calculated. An area (hereinafter, referred to as an "obstacle presence area") where an obstacle is present from among a plurality of areas C1 to C3, L1 to L3, and R1 to R3 of the obstacle detection zone Z is detected.

The maximum speed set in the detected obstacle presence area is determined as a target maximum speed which is a target value for deceleration control. When a plurality of obstacles are present, and a plurality of obstacle presence areas are detected, a plurality of target maximum speeds may be determined. In this case, the maximum speed from among a plurality of target maximum speeds is determined as a final target maximum speed. When an obstacle is absent, a target maximum speed is not determined. In this case, the speed constantly depends on the accelerator operation of the driver.

Finally, it is determined whether or not the current vehicle speed of the moving vehicle X is equal to or lower than the target maximum speed on the basis of a speed signal input from the speed sensor 12. When it is determined that the current speed of the moving vehicle X is higher than the target maximum speed, a target braking force necessary for causing the speed of the moving vehicle X to be equal to or lower than the target maximum speed is set, and a motor regeneration control signal is transmitted to the inverter 13 on the basis of the target braking force. If necessary, a brake control signal is transmitted to the brake actuator 14.

Accordingly, the driving motor 16 performs regenerative power generation to generate a regenerative braking force, and the brake 17 is actuated to generate a braking force. As a result, the vehicle speed of the moving vehicle X is reduced to be equal to or lower than the target maximum speed. When the current vehicle speed of the moving vehicle X is equal to or lower than the target maximum speed, the processing ends directly without performing deceleration control.

With the above, the wheelbase length detection sensor 11 constitutes a wheelbase length information acquisition unit, the laser radar 10 constitutes an obstacle information acquisition unit, and the ECU 15 constitutes a deceleration control unit.

As described above, according to this embodiment, deceleration control changes depending on the wheelbase length, making it possible to suppress the disturbance of the moving vehicle due to the wheelbase length when deceleration control is performed, without taking into consideration the wheelbase length for deceleration control. Therefore, it becomes possible to appropriately perform deceleration control in the moving vehicle X having a variable wheelbase length. That is, in this embodiment, deceleration control can be performed with a deceleration pattern suitable for a vehicle posture, making it possible to perform necessary deceleration control while suppressing unnecessary deceleration control. As a result, in this embodiment, it can be said that, in the moving vehicle X having a variable wheelbase length, the deceleration pattern of the safety system which monitors the traveling direction to determine a collision possibility and performs deceleration can change depending on the wheelbase length.

In this embodiment, as described above, the shape of each of the areas C1 to C3, L1 to L3, and R1 to R3 of the obstacle detection zone Z in the deceleration map changes depending on the wheelbase length. Specifically, the shape changes such that, as the wheelbase length increases, the areas C1 to C3, L1 to L3, and R1 to R3 are expanded forward (the length increases). The shape changes such that, as the wheelbase length decreases, the areas C1 to C3, L1 to L3, and R1 to R3 are expanded in the width direction (the width increases). Therefore, it becomes possible to perform preferable deceleration control suitable for the behavior characteristics of the moving vehicle X relating to the wheelbase length, thereby further appropriately performing deceleration control. It is also possible to stabilize the behavior of the moving vehicle X.

In this embodiment, as described above, the maximum speed is set in each of the areas C1 to C3, L1 to L3, and R1 to R3 obtained by dividing the forward area of the moving vehicle X. Deceleration control is performed such that the vehicle speed of the moving vehicle X is lower than the maximum speed of an area where an obstacle is present. Therefore, when an obstacle is present in one of the collision monitoring areas C1 to C3, deceleration can be performed to a sufficiently low speed, thereby securing safety against an obstacle. When an obstacle is present in one of the peripheral monitoring areas L1 to L3 and R1 to R3, deceleration to a low speed is not required in the collision monitoring areas C1 to C3, and the driver does not feel a sense of discomfort. Therefore, it is possible to easily perform appropriate deceleration control depending on the obstacle position when preventing the moving vehicle from being in contact with the obstacle.

Although the preferred embodiment of the invention has been described, the invention is not limited to the foregoing embodiment. For example, although in the foregoing embodiment, a case has been described where a one-seater electric vehicle is a moving vehicle, the moving vehicle is not limited, and any moving vehicle may be used insofar as the moving vehicle has a variable wheelbase length.

Although in the foregoing embodiment, the maximum speed is set as a deceleration pattern in each of the areas C1 to C3, L1 to L3, and R1 to R3 of the obstacle detection zone Z, other parameters, such as a deceleration or a deceleration change rate, may be added as deceleration patterns.

Although the wheelbase length detection sensor 11 of the foregoing embodiment detects the wheelbase length on the basis of the rotation speed of a variable motor for varying a wheelbase length, for example, the wheelbase length may be detected directly by a stroke sensor. The inclination state of the moving vehicle X may be detected to detect the wheelbase length. That is, it should suffice that the wheelbase length detection sensor 11 can acquire wheelbase length information relating to the wheelbase length.

Although in the foregoing embodiment, the laser radar 10 is used to monitor forward of the moving vehicle X, instead or in addition, another monitoring sensor may be used to monitor the periphery (rearward, sideward) of the moving vehicle X. Although in the foregoing embodiment, the areas C1 to C3, L1 to L3, and R1 to R3 of the obstacle detection zone Z are changed depending on the wheelbase length, it should suffice that at least one of the areas C1 to C3, L1 to L3, and R1 to R3 is changed.

When the moving vehicle X is turning forward, as the obstacle detection zone Z, an obstacle detection zone is set which is expanded in a rectangular shape such that the front side is bent along a turning route (curve R) in front of the moving vehicle X. The same maximum may be set in both the areas of the obstacle detection zone Z during straight driving and the areas of the obstacle detection zone Z during turning, or a low maximum speed may be set in each area of the obstacle detection zone Z during turning. In each area of the obstacle detection zone Z during turning, the smaller the curve R, the lower the maximum speed may be set.

Although in the foregoing embodiment, the nine areas C1 to C3, L1 to L3, and R1 to R3 are set in the obstacle detection zone Z, the number of areas may be changed as necessary. The maximum speed may be set by a certain function without setting the areas.

INDUSTRIAL APPLICABILITY

According to the invention, it is possible to appropriately perform deceleration control in a moving vehicle having a variable wheelbase length.

REFERENCE SIGNS LIST

1: driving assistance device, 10: laser radar (obstacle information acquisition unit), 11: wheelbase length detection sensor (wheelbase length information acquisition unit), 15: ECU (deceleration control unit), C1 to C3, L1 to L3, R1 to R3: area, X: moving vehicle.

The invention claimed is:

1. A driving assistance device which is mounted in a moving vehicle having a variable wheelbase length and assists driving of the moving vehicle, the driving assistance device comprising:
 a wheelbase length information acquisition unit which acquires current wheelbase length information relating to the variable wheelbase length of the moving vehicle;
 an obstacle information acquisition unit which acquires obstacle information relating to an obstacle around the moving vehicle; and
 a deceleration control unit which performs deceleration control of the moving vehicle on the basis of the obstacle information acquired by the obstacle information acquisition unit,
 wherein the deceleration control unit changes the deceleration control depending on the wheelbase length information acquired by the wheelbase length information acquisition unit;
 wherein the deceleration control unit performs the deceleration control on the basis of a deceleration control map which includes a plurality of areas set around the moving vehicle and deceleration patterns set for the plurality of areas,
 when an obstacle presence area, where the obstacle is present from among the plurality of areas, is detected on the basis of the obstacle information, the deceleration control is performed with the deceleration pattern in the detected obstacle presence area,
 the plurality of areas in the deceleration control map are changed depending on the wheelbase length information,
 the moving vehicle includes a mechanism which is deformed by varying a wheelbase length, and
 the plurality of areas are constituted by dividing an obstacle detection zone which is an area on a route in which the moving vehicle is driven.

2. The driving assistance device according to claim 1,
wherein the obstacle information acquisition unit acquires obstacle information relating to an obstacle in front of the moving vehicle, and
 the deceleration control unit changes at least one of a plurality of areas set in front of the moving vehicle in the deceleration control map so as to be expanded forward as the wheelbase length increases or so as to be expanded in a width direction as the wheelbase length decreases.

3. The driving assistance device according to claim 1,
wherein the deceleration control unit performs the deceleration control such that a speed of the moving vehicle is equal to or lower than a predetermined speed.

4. The driving assistance device according to claim 2,
wherein the deceleration control unit performs the deceleration control such that a speed of the moving vehicle is equal to or lower than a predetermined speed.

* * * * *